Patented May 19, 1925.

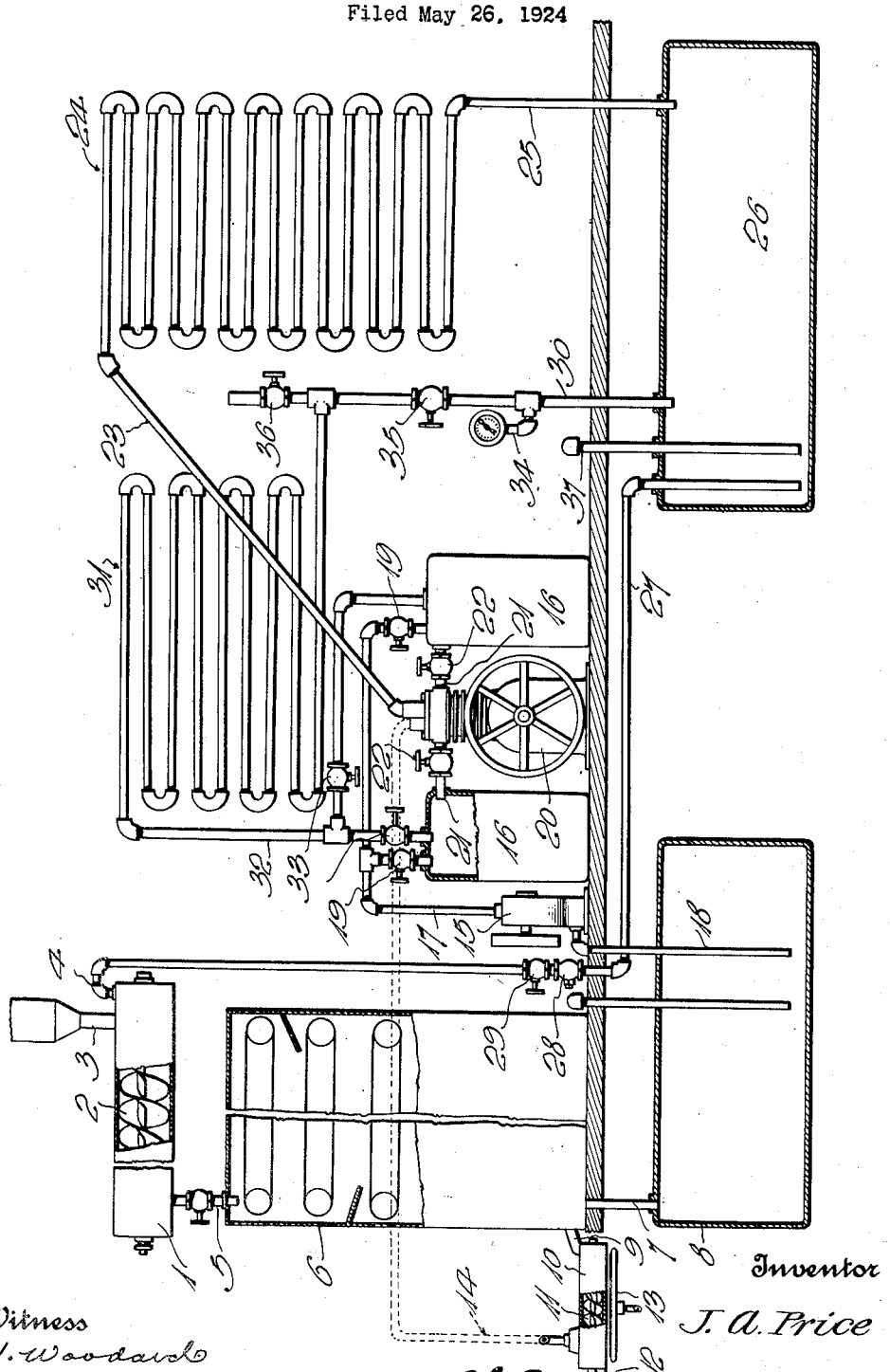

1,538,589

UNITED STATES PATENT OFFICE.

JAMES ALBERT PRICE, OF DALLAS, TEXAS, ASSIGNOR TO AMERICAN SULPHUR & FERTILIZER COMPANY, INC., OF DALLAS, TEXAS.

METHOD AND APPARATUS FOR EXTRACTING SULPHUR FROM ITS ORE.

Application filed May 26, 1924. Serial No. 716,015.

*To all whom it may concern:*

Be it known that I, JAMES A. PRICE, a citizen of the United States, residing at Dallas, in the county of Dallas and State of Texas, have invented certain new and useful Improvements in Methods and Apparatus for Extracting Sulphur from its Ore; and I do declare the following to be a full, clear, and exact description of the invention, such as will enable others skilled in the art to which it appertains to make and use the same.

This invention, relating to the art of reclaiming minerals, is a method and apparatus for extracting sulphur and other minerals from their ores.

The invention has been devised in order to provide for the extraction of minerals from their ores at the mines, which are usually located at points where fuel and water suitable for heating purposes are scarce. In carrying out the invention, all of the power and heat necessary may be obtained from oil, which generally exists in the regions where the mineral mines are located, or which can be transported to the mine much easier and cheaper than coal can. While water may be used for cooling purposes, the method and apparatus does not employ water or steam for heating or similar purposes, so that the water found at the mine having a large mineral content may be used very satisfactorily.

In carrying out the invention, the ore obtained from the mines is first crushed and pulverized and then treated with a solvent to dissolve the desired mineral out of the same. This solvent is then filtered and the filtrate or filtered solvent is evaporated so as to leave a residue of mineral. The method is economical because the solvent vapors obtained by the evaporation of the solvent are condensed and used over and over again for treating the ore. The method of evaporating the solvent is novel in that no heat is applied Instead of this, the solvent is placed in a closed vessel and the air and vapors are extracted therefrom. While this is going on, blasts of air which may be warmed by the sun, are injected into the vessel so as to cause spray from the surface of the solvent to be deposited upon the walls of the vessel, where it evaporates, leaving the pure mineral as a residue clinging upon the wall. In this way, a very high grade quality of the mineral may be obtained.

In further describing the invention, reference will be made to the accompanying drawing in which an apparatus suitable for carrying out the method is diagrammatically illustrated.

The apparatus shown in the drawing includes a mixing device 1, which preferably consists of a horizontally disposed tube or vessel closed at both ends and having mounted therein a spiral conveyor and mixing element 2. The crushed and pulverized ore is fed into the device 1 through the inlet 3, and at the same time, a solvent for the mineral contained in the ore is introduced into the device 1 through the inlet 4. The invention has been especially devised for the extraction of sulphur from sulphur bearing ore, so that when it is used for this purpose, the solvent may consist of carbon bi-sulphide. The conveyor 2 mixes the ore and the solvent, causing the sulphur or mineral to be dissolved by the solvent and conveys the whole mass to one end where it runs through a pipe 5 to a hermetically sealed filter 6.

The filter 6, which is preferably hermetically sealed in a closed tank or vessel, may be constructed as disclosed by my co-pending application, Serial No. 716014, filed May 26, 1924. It is not necessary to herein describe the construction of the filter or explain its operation, except to state that the filter separates all foreign matter from the solution. The filtrate or filtered solution passes through a pipe 7 into an underground storage tank 8, while the residue or foreign matter separated from the solution by the filter, passes through a pipe or other suitable conveyor 9 into a drying device 10. This drying device is provided with a spiral conveyor which causes the residue or foreign matter to pass through the device to an outlet 12. The drying device may be heated or warmed by suitable means, such as the burner 13 and the air or solvent vapors passing off from the residue or foreign matter are accumulated in the device 10 and may be conveyed by a pipe 14 into another part of the apparatus, which will be later described.

The solution contained in the tank 8 is pumped by means of a pump 15 into one or more evaporating tanks 16. In the drawing, two of these tanks are shown, and both of these are connected by piping 17 to the discharge side of the pump 15, the intake side of the pump 15 being connected by a pipe 18 to the tank 8. Valves 19 are preferably placed in the piping 17 to control the admission of the solution into the tanks 16.

The numeral 20 represents an air pump, the intake side of which is connected by pipes 21 provided with valves 22, to the upper portions of the evaporating tanks 16. The pipe 14 from the drying device 10 also leads to the intake side of the air pump 20. The discharge side of the air pump 20 discharges into a pipe 23 which is connected to a condensing coil or series of coils 24. A pipe 25 leads from the coils 24 into an underground storage tank 26 for the reclaimed solvent, and this tank has a pipe connection 27 with the solvent inlet 4 of the mixing device 1. If desired, the piping 27 may be provided with a check valve 28 and a valve 29 to regulate the flow of the solvent from the tank 26 to the mixing device 1.

There is always a certain amount of air in the apparatus and this air is separate from the solvent in the tank 26. It is conveyed from the tank 26 by a pipe 30 to an air warming coil 31, from which it is conveyed and introduced into the evaporating tanks 16 by piping 32, suitable valves 33 being disposed in the piping 32 to control the admission of the warm air into the tanks 16. If desired, the pipe 30 may be provided with a pressure gauge 34 and a pressure regulating valve 35, and also a valve 36 to relieve pressure when testing or determining the amount of solvent in the tank 26 through the pipe 37.

The air warming coil 31 may be heated or warmed in any suitable manner, but much heat is not desired or necessary, so that where the apparatus is used at a place where there is considerable sunshine, the coil may be warmed entirely by the sun.

The connecting coils 24 may be cooled in any suitable manner, but probably the most suitable way of doing this, is to place them so that water may run over them.

In operating the apparatus, the crushed or pulverized ore is fed into the mixing device 1 and at the same time the solvent is introduced therein. This causes the mineral contained in the ore to be dissolved by the solvent. From there, it passes into the filter 6 where the foreign matter is separated from the solvent. The filtrate or solution then passes into the tank 8, from which it may be pumped into the evaporating tanks 16 by the pump 15. After the tanks 16 have been filled to the desired point with the solution, the valves 19 should be closed, and then with the valves 33 closed, the air pump 20 should be started. This will extract the air from the tanks 16. In practice, it is best to operate the apparatus with one of the valves 22 closed, so that the pump 20 only acts upon one of the tanks at a time. As the air is extracted from one of the tanks 16, the solution contained therein will start to quickly evaporate, the air and vapors passing through the pipe 21, the pump 20, and then the pipe 23 into the condensing coils 24.

After the air pump 20 has been in operation for a short time and the solution contained in the tanks 16 has started to evaporate freely, the valves 33 to that tank should be opened, so as to permit blasts of warm air to be introduced into the tank 16 and onto the surface of the solution. These warm air blasts will cause spray from the surface of the solution to be deposited on the walls of the tank 16 where it will quickly and easily evaporate, leaving the pure mineral as a residue clinging to the walls. Of course, some of the mineral will be left as a residue at the bottom of the tank, but if this residue will be removed from the tank and then kept separate from the residue deposited upon the walls of the tank, it will be found that the residue deposited upon the walls of the tank will be of a superior quality to that deposited at the bottom of the tank. If it is sulphur bearing ore that is treated by the method, the sulphur deposited upon the walls of the tank will be the purest high-grade fluffy crystalline sulphur that is obtainable.

After the solution contained in one of the tanks 16 has been completely evaporated in the manner described, the solution contained in the other tank may be evaporated in the same manner, while the residue left in the first tank is being removed. In this way, the method may be carried out continuously, and no time will be lost in collecting the sulphur or minerals.

The solvent vapors and air which are exhausted from the tanks 16 pass through the condensing coils 24. In these coils 24, the solvent vapors are condensed and the reclaimed solvent then passes into the underground storage tank 26. This tank serves as a means for separating the reclaimed solvent from the air, for the solvent being a liquid collects in the bottom of the tank and the air collects in the gas space above the liquid.

The air passes through the pipe 30 from the tank 26 into the air warming coils 31 and then into a piping 32 to one of the tanks 16, according to which valve 33 is open. The solvent from the tank 26 is conveyed back into the mixing device by the pipe 27.

From the foregoing, it will be seen that the various parts of the device are coupled together by pipes and piping and arranged in a continuous circuit so that the air and the solvent are used over and over again. This makes the method very economical, because none of the solvent is wasted and none of the air is discharged into the atmosphere carrying with it mineral laden solvent vapors.

Very little power is required to operate the apparatus and very little labor is necessary so that the process may be carried out cheaply. It may be carried out at the mines where ore is mined, inasmuch as the only fuel necessary to operate the apparatus is oil, and inasmuch as the only way in which water is used is for cooling the condensing coils.

Although the best mode of carrying out the method has been specifically explained, it is obvious that it may be carried out in other equivalent ways without departing from the spirit and principle of the invention or sacrificing any of the advantages thereof, so that the appended claims which define the novelty contained in the invention are intended to contemplate and cover such changes as are necessary to adapt the method and apparatus for a particular purpose or use not herein disclosed.

I claim:

1. The herein-described method of extracting a mineral from its ore, which consists in treating the ore with a solvent to extract the mineral therefrom, and evaporating the solution in a vessel while causing the surface of the solution to be sprayed onto the walls of the vessel so as to cause part of the pure mineral to be deposited as a residue on the walls of the vessel.

2. The herein-described method of extracting a mineral from its ore, which consists in treating the ore with a solvent to extract the mineral therefrom, and evaporating the solution in a vessel while blowing upon the surface thereof to cause spray from the surface of the solution to be deposited on the walls of the vessel where it evaporates and leaves a residue of pure mineral.

3. The herein-described method of extracting a mineral from its ore, which consists in treating the ore with a solvent to extract the mineral therefrom, and evaporating the solution in a closed vessel while introducing blasts of air into the vessel onto the surface of the solution to cause spray from the surface of the solution to be deposited on the walls of the vessel where it evaporates and leaves a residue of pure mineral.

4. The herein-described method of extracting sulphur from its ore, which consists in treating the ore with carbon bi-sulphide to dissolve the sulphur out of the ore, and evaporating the resulting solution in a closed vessel while introducing blasts of warm air into the vessel onto the surface of the solution to cause spray from the surface of the solution to be deposited on the walls of the vessel where it evaporates and leaves a residue of pure sulphur.

5. The herein-described method of extracting a mineral from its ore, which consists in treating the ore with a solvent to extract the mineral therefrom, placing the solution in a closed vessel, and extracting the air and vapor therefrom so as to cause the solution to evaporate while introducing blasts of warm air into the vessel onto the surface of the solution to cause spray from the surface of the solution to be deposited on the walls of the vessel where it evaporates and leaves a residue of pure mineral.

6. The herein-described method of extracting a mineral from a solution, which consists in placing the solution in a closed vessel, and extracting the air and vapor therefrom so as to cause the solution to evaporate, while introducing blasts of warm air into the vessel onto the surface of the solution to cause spray from the surface of the solution to be deposited on the walls of the vessel where it evaporates and leaves a residue of pure mineral.

7. The herein-described method of extracting a mineral from a solution, which consists in evaporating the solution in a vessel while blowing upon the surface thereof to cause spray from the surface of the solution to be deposited on the walls of the vessel where it evaporates and leaves a residue of pure mineral.

8. The herein-described method of extracting a mineral from its ore, which consists in treating the ore with a solvent to extract the mineral therefrom, filtering the solution, placing the filtered solution in a closed vessel, extracting the air and vapor from the vessel so as to cause the solution to evaporate while introducing blasts of warm air into the vessel so as to cause the mineral to be deposited as a residue in the vessel, condensing the solvent vapor and separating the air therefrom, conveying the condensed solvent back to be used in treating a new batch of ore, and warming the separated air and conveying it back for introduction into the vessel.

9. An apparatus for extracting a mineral from its ore comprising a mixing device for mixing a solvent with the ore to extract the mineral therefrom, a filter for filtering the resulting solution, a closed evaporating tank for the filtered solution, means for extracting air and vapor from said tank, condensing coils for condensing the solvent vapor, a storage tank for the condensed solvent serving as a means to separate the air from the latter, a warming coil for the separated air, means for introducing the warmed air into the evaporating tank, means for introducing the condensed solvent into the mixing device, and connections forming a closed circuit of the specified devices arranged in the circuit in the order set forth permitting the solvent and air to be used over and over.

10. The apparatus specified in claim 9, and in addition thereto, a drying device for the residue from the filter, and means for conveying the air and vapor from the drying device to the condensing coils.

11. The apparatus specified in claim 9, in which the air warming coil is located outdoors to be warmed by the heat from the sun.

In testimony whereof I have hereunto affixed my signature.

JAMES ALBERT PRICE.